(12) United States Patent
Teramura

(10) Patent No.: US 8,229,323 B2
(45) Date of Patent: Jul. 24, 2012

(54) SCANNING OPTICAL APPARATUS AND IMAGE FORMING APPARATUS USING THE SAME, WHICH ARE CAPABLE OF REDUCING A CHANGE OF AN IRRADIATION POSITION OF A LIGHT FLUX ON A DEFLECTION UNIT

(75) Inventor: Masayasu Teramura, Utsunomiya (JP)

(73) Assignee: Canon Kabushiki Kaisha (JP)

(*) Notice: Subject to any disclaimer, the term of this patent is extended or adjusted under 35 U.S.C. 154(b) by 461 days.

(21) Appl. No.: 12/614,846

(22) Filed: Nov. 9, 2009

(65) Prior Publication Data

US 2010/0119258 A1    May 13, 2010

(30) Foreign Application Priority Data

Nov. 10, 2008   (JP) ................................ 2008-287638

(51) Int. Cl.
*G03G 15/22*   (2006.01)
*G02B 26/10*   (2006.01)
(52) U.S. Cl. ...................................... 399/151; 359/207.1
(58) Field of Classification Search .................. 399/151, 399/207; 359/207.1, 207.4, 207.6, 208.2, 359/207.2, 205.1, 207.8
See application file for complete search history.

(56) References Cited

U.S. PATENT DOCUMENTS 6,914,705 B2 *   7/2005   Nakai ........................ 359/204.1

FOREIGN PATENT DOCUMENTS

JP          2001-194611 A       7/2001

* cited by examiner

*Primary Examiner* — Walter L Lindsay, Jr.
*Assistant Examiner* — Billy J Lactaoen
(74) *Attorney, Agent, or Firm* — Rossi, Kimms & McDowell LLP

(57) ABSTRACT

A scanning optical apparatus includes: an incident optical system which is disposed in an optical path between a light source unit and a deflection unit, and includes an optical element for making a light flux emitted from the light source unit enter a deflection surface of the deflection unit with an oblique angle in a sub scanning section; and a positional regulation member for holding the optical element having an x reference surface for performing positional regulation of the optical element in an optical axis direction and a z reference surface for performing positional regulation of the optical element in a sub scanning direction. The optical element is held by a casing so that the x reference surface and the z reference surface contact with the positional regulation member of the casing. The principal ray of the light flux outgoing from the optical element satisfies a conditional equation (1).

11 Claims, 5 Drawing Sheets

SCANNING OPTICAL APPARATUS AND IMAGE FORMING APPARATUS USING THE SAME, WHICH ARE CAPABLE OF REDUCING A CHANGE OF AN IRRADIATION POSITION OF A LIGHT FLUX ON A DEFLECTION UNIT

BACKGROUND OF THE INVENTION

1. Field of the Invention

The present invention relates to an optical scanning apparatus and an image forming apparatus using the same. In particular, the present invention is suited to an image forming apparatus such as a laser beam printer, a digital copying machine, or a multifunction printer, which employs an electrophotographic process.

2. Description of the Related Art

In a laser beam printer, a digital copying machine, a multifunction printer, or other image forming apparatus (image output portion) employing an electrophotographic process, scanning is performed on a photosensitive member (photosensitive drum) with a light flux (laser light flux) that blinks in accordance with print data.

Thus, exposure distribution is formed, and image formation is realized by an electrostatic copying mechanism in accordance with the exposure distribution.

In recent years, a resin material is frequently used for imaging optical elements to be used for a scanning optical apparatus so as to achieve high precision and a simple structure of the scanning optical apparatus.

When the resin material is used for the imaging optical element, molding of the resin can be performed so that lenses and mirrors having an aspheric surface can be manufactured easily.

Further, if a casing for holding a shape of the lenses and mirrors is also made of the resin molding, lighter weight and a simpler structure can be realized, and a flexible lens arrangement can be achieved, compared with a conventional casing made by metal cutting or casting.

Various types of such scanning optical apparatus have been proposed conventionally (see Japanese Patent Application Laid-Open No. 2001-194611).

In order to perform high precision recording of image information in such scanning optical apparatus, it is necessary that a curvature of field be corrected appropriately over an entire area of a surface to be scanned (image surface), and that an angle of field (scanning angle) θ and an image height Y have distortion characteristic (fθ characteristic) accompanied with isokinetic property.

Further, it is necessary that a spot diameter on the surface to be scanned be uniform with respect to each image height.

Recently, along with higher resolution of a laser beam printer, imaging performance of higher image quality is required. Therefore, it is required to mount a component with a micron order precision of the position when the apparatus main body is assembled.

However, a manufacturing error of a component, a mounting positional error in the assembling process, and other various errors may occur when the main body is assembled, which may cause fluctuation in performance of the products. As a typical problem caused by the fluctuation, there is a problem of a shift of an imaging position due to a tilt of imaging field generated in a deflection surface of an optical deflector.

Usually, the tilt of imaging field in the deflection surface can be canceled by disposing an imaging optical element so that an object point on a deflection surface and an image point on the photosensitive drum have a conjugate relationship in the scanning optical apparatus.

Therefore, a cylindrical lens, which is disposed for a purpose of condensing light on the deflection surface in an incident optical unit for forming the object point on the deflection surface, has an important role in forming the object point on the deflection surface.

Concerning the cylindrical lens, a shift due to an error in an optical axis direction does not cause a change of the irradiation position, but other error in the other direction (in yz plane) shows up as a shift of the irradiation position on the deflection surface. Consequently, the image point is shifted in a main scanning direction and in a sub scanning direction on the image surface.

In addition, some correction is performed finally for the fluctuation in optical performance due to the above-mentioned error.

For instance, correction of a scanning line bend is corrected by bending a scanning line in the same direction by the same degree for each color so that a color drift does not occur in the developing step.

For this reason, it is necessary to decrease an influence of an error as much as possible in the light ray (light flux) to be a reference for correction.

However, such attention has not been given to the optical element of the incident optical system in the conventional scanning optical apparatus.

Recently, the attention as described above has become an indispensable for realizing a micro spot of the light flux or multi-beam thereof, which requires high assembly precision.

Therefore, it is important to design so that errors that may occur in components or in the assembly process can be reduced as much as possible.

SUMMARY OF THE INVENTION

It is an object of the present invention to provide a scanning optical apparatus and an image forming apparatus using the same, which are capable of reducing a change of an irradiation position of a light flux on a deflection unit, that is, a change of an incident position of the light flux on a surface to be scanned due to an error that may occur in a manufacturing process or in an attachment step, and of obtaining a stable image with high image quality.

In order to achieve the above-mentioned object, according to one aspect of the present invention, a scanning optical apparatus includes; a light source unit including a plurality of light emission portions, a deflection unit for deflecting a plurality of light fluxes for scanning that are emitted from the plurality of light emission portions, an incident optical system which is disposed in an optical path between the light source unit and the deflection unit, and includes a plurality of optical elements disposed for each of the plurality of light fluxes so as to make each of the plurality of light fluxes emitted from the plurality of light emission portions enter a deflection surface of the deflection unit with an oblique angle in a sub scanning section, a plurality of imaging optical systems disposed so as to correspond to the plurality of light fluxes deflected for scanning by the same deflection surface of the deflection unit, and a positional regulation member for holding the plurality of optical elements each having an x reference surface for performing positional regulation of the optical element in an optical axis direction and a z reference surface for performing positional regulation of the optical element in a sub scanning direction, in which; each of the plurality of imaging optical systems makes each of the plurality of light fluxes deflected for scanning by the deflection surface of the deflection unit form an image on a surface to be scanned, the plurality of optical elements are formed integrally, the plurality of light fluxes outgo from the plurality of optical elements with different angles in the sub scanning section, each of principal rays of the plurality of light fluxes emitted from the plurality of light emission portions is parallel to an optical axis of each of the plurality of optical elements in the sub scanning section, each of the plurality of optical elements is held by a casing so that the x reference surface and the z reference surface of each of the plurality of optical elements contact with the positional regulation member, and when an angle between a normal of the x reference surface and each of the principal rays of the plurality of light fluxes outgoing from the plurality of optical elements in the sub scanning section is denoted by θ, an angle between the principal ray having a smallest value of θ among the plurality of light fluxes outgoing from the plurality of optical elements and a normal of the deflection surface in the sub scanning section is denoted by α, a light flux diameter of the light flux entering an incident surface of the optical element in the sub scanning section is denoted by D, and an optical path length from the incident surface of the optical element to the deflection surface is denoted by L, with regard to the principal ray of at least one light flux of the plurality of light fluxes outgoing from the plurality of optical elements, the following conditional equation is satisfied $$|\theta| < 0.9|\alpha| \tag{1},$$

and with regard to the angle α between the light flux outgoing from the optical element and the normal of the deflection surface in the sub scanning section, the following conditional equation is satisfied $$\tan\alpha > \frac{D}{2L}. \tag{2}$$

Further, the above-mentioned scanning optical apparatus can further comprise a synchronization detection sensor for detecting a part of the light flux deflected for scanning by the deflection surface of the deflection unit, the synchronization detection sensor deciding a write start position timing on the surface to be scanned of the plurality of light fluxes deflected for scanning by the deflection surface of the deflection unit, wherein the light flux for synchronization detection detected by the synchronization detection sensor can satisfy the conditional equation (1).

Further, in the scanning optical apparatus, each of the principal rays of the plurality of light fluxes outgoing from the plurality of optical elements can satisfy the following conditional equation $$|\theta| < 0.9|\alpha| \tag{3}.$$

Further, in the scanning optical apparatus, each of the plurality of optical elements forming the incident optical system can have an absolute value of power in the sub scanning direction that is larger than an absolute value of power in a main scanning direction.

Further, in the scanning optical apparatus, the angle θ between the normal of the x reference surface and the principal ray of the light flux that satisfies the conditional equation (1) in the sub scanning direction can be zero.

Further, in the scanning optical apparatus, the positional regulation member for holding the plurality of optical elements can be made of resin and molded integrally with the casing.

Further, an image forming apparatus according to one aspect of the present invention can comprise; any one of the scanning optical apparatuses described above, a photosensitive member disposed on the surface to be scanned, a developing device for developing an electrostatic latent image formed on the photosensitive member by the light flux deflected for scanning by the scanning optical apparatus to be a toner image, a transferring device for transferring the toner image after the developing onto a transfer material, and a fixing device for fixing the transferred toner image on the transfer material.

Further, in order to achieve the above-mentioned object, according to another aspect of the present invention, a scanning optical apparatus comprises; a light source unit, a deflection unit for deflecting a light flux for scanning that is emitted from a light emission portion of the light source unit, an incident optical system which is disposed in an optical path between the light source unit and the deflection unit, and includes an optical element for making the light flux emitted from the light emission portion enter a deflection surface of the deflection unit with an oblique angle in a sub scanning section, an imaging optical system for making the light flux deflected for scanning by the deflection surface of the deflection unit form an image on a surface to be scanned, and a positional regulation member for holding the optical element having an x reference surface for performing positional regulation of the optical element in an optical axis direction and a z reference surface for performing positional regulation of the optical element in a sub scanning direction, wherein; a principal ray of the light flux emitted from the light emission portion is parallel to an optical axis of the optical element in the sub scanning section, the optical element is held by a casing so that the x reference surface and the z reference surface of the optical element contact with the positional regulation member, and when an angle between a normal of the x reference surface and the principal ray of the light flux outgoing from the optical element in the sub scanning section is denoted by θ, an angle between the light flux outgoing from the optical element and a normal of the deflection surface in the sub scanning section is denoted by α, a light flux diameter of the light flux entering an incident surface of the optical element in the sub scanning section is denoted by D, and an optical path length from the incident surface to the deflection surface of the optical element is denoted by L, with regard to the principal ray of the light flux outgoing from the optical element, the following conditional equation is satisfied $$|\theta| < 0.9|\alpha| \tag{4},$$

and with regard to the angle α between the light flux outgoing from the optical element and the normal of the deflection surface in the sub scanning section, the following conditional equation is satisfied $$\tan\alpha > \frac{D}{2L}. \tag{5}$$

Further, the above-mentioned scanning optical apparatus can further comprise a synchronization detection sensor for detecting a part of the light flux deflected for scanning by the deflection surface of the deflection unit, the synchronization detection sensor deciding a write start position timing on the surface to be scanned of the light flux deflected for scanning by the deflection surface of the deflection unit, wherein the light flux for synchronization detection detected by the synchronization detection sensor can satisfy the conditional equation (4).

Further, in the scanning optical apparatus, the angle θ between the normal of the x reference surface and the principal ray of the light flux that satisfies the conditional equation (4) in the sub scanning direction can be zero.

Further, an image forming apparatus according to another aspect of the present invention can comprise; any one of the scanning optical apparatuses described above, a photosensitive member disposed on the surface to be scanned, a developing device for developing an electrostatic latent image formed on the photosensitive member by the light flux deflected for scanning by the scanning optical apparatus to be a toner image, a transferring device for transferring the toner image after the developing onto a transfer material, and a fixing device for fixing the transferred toner image on the transfer material.

According to the present invention, it is possible to provide the scanning optical apparatus and the image forming apparatus using the same, which are capable of reducing a change of the irradiation position of the light flux on the deflection unit, that is, a change of the incident position of the light flux on the surface to be scanned due to an error that may occur in the manufacturing process or in the attachment step, and of obtaining a stable image with high image quality.

Further features of the present invention will become apparent from the following description of exemplary embodiments with reference to the attached drawings.

DESCRIPTION OF THE EMBODIMENTS

An incident optical system of the present invention is held in a casing made of resin.

Further, the casing is provided with a positional regulation member for holding the incident optical system, which is formed integrally when the casing is molded.

The casing has a tapered angle that is necessary for die cutting of the positional regulation member when the casing is molded with resin.

The incident optical system has an x reference surface and a z reference surface for positional regulation of rotation about an axis parallel to a main scanning direction. The reference surface is positioned along an inclined surface of the positional regulation member.

In this case, the angle between the reference surface and a principal ray of one outgoing light flux among a plurality of outgoing light fluxes from the incident optical system is set to be substantially a right angle.

Hereinafter, embodiments of the present invention are described with reference to the attached drawings.

In the description below, a sub scanning direction (Z direction) is a direction parallel to a rotational axis of a deflection unit.

A main scanning section is a section in which the sub scanning direction (direction parallel to the rotational axis of the deflection unit) is the normal.

A main scanning direction (Y direction) is a direction in which light fluxes deflected for scanning by the deflection unit are projected on the main scanning section.

A sub scanning section is a section in which the main scanning direction is the normal.

(First Embodiment)

Figure 1:
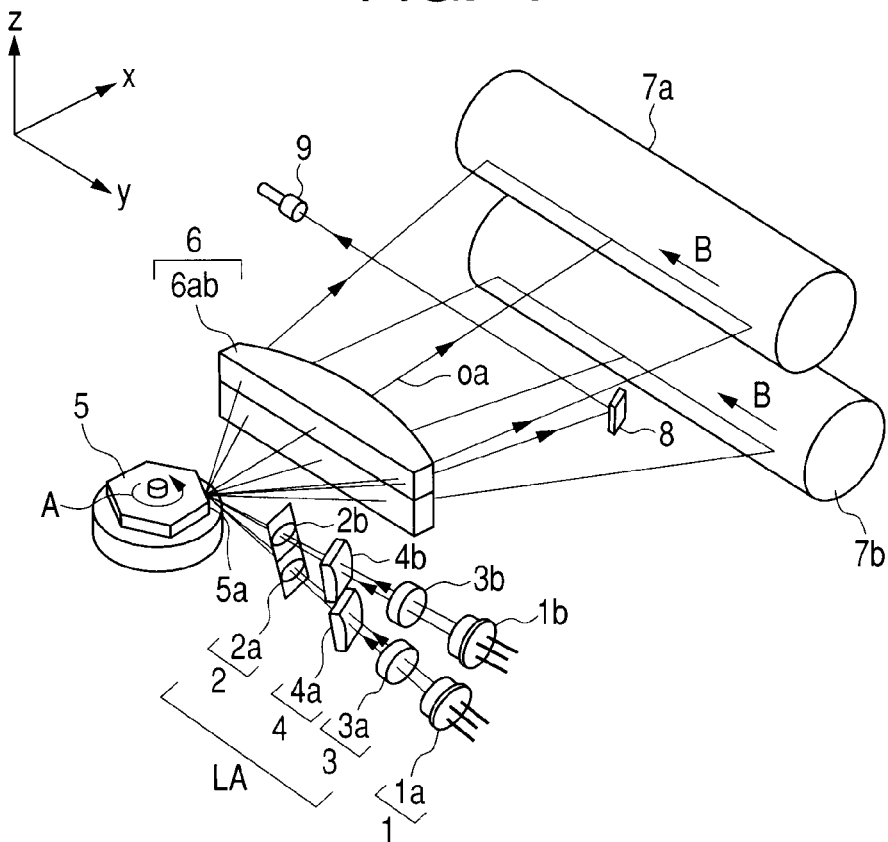
FIG. 1 is a schematic view of a main part according to a first embodiment of the present invention.

FIG. 1 is a schematic view of a main part of a scanning optical apparatus according to a first embodiment of the present invention.

Figure 2:
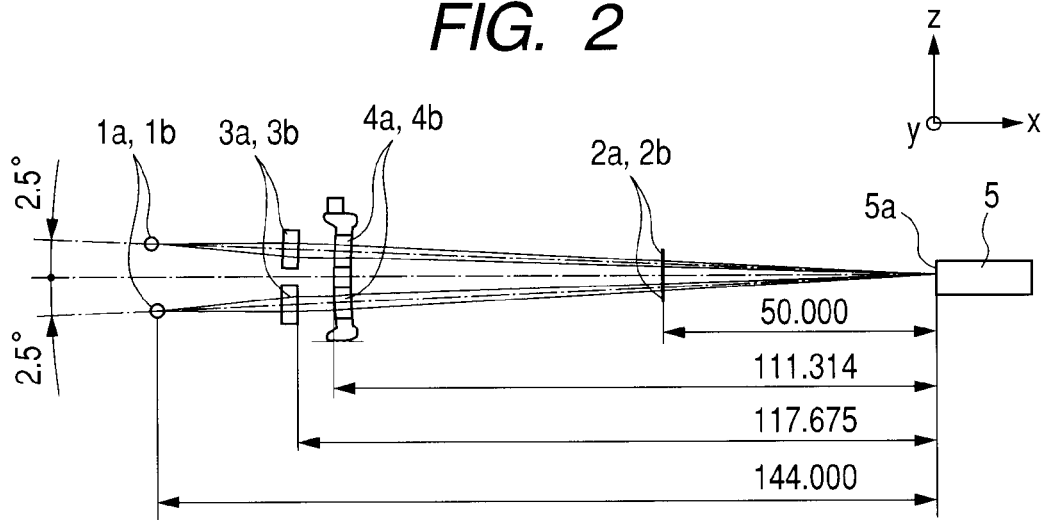
FIG. 2 illustrates a sub scanning section of a part from a light source unit to a deflection unit according to the first embodiment of the present invention.

FIG. 2 illustrates a cross section (sub scanning section) of a main part in the sub scanning direction from a light source unit to a deflection unit according to the first embodiment of the present invention.

In the diagram, a light source unit 1 includes a plurality of light sources.

This embodiment illustrates the case where two light sources 1a and 1b are disposed.

Each of the light sources 1a and 1b is formed of a semiconductor laser.

Note that this embodiment uses the plurality of light sources as the light source unit, but this structure should not be interpreted as a limitation. It is also possible to use a single light source including a plurality of light emission portions for forming the light source unit.

A condensing optical system 3 includes two condensing lenses (collimator lenses) 3a and 3b.

The two collimator lenses 3a and 3b convert diverged light fluxes emitted from the corresponding light sources 1a and 1b into parallel light fluxes.

Material of the collimator lenses 3a and 3b in this embodiment has a refractive index $N_d$ of 1.7725. Each of the collimator lenses 3a and 3b is a spherical lens having an incident surface without power (refractive power) and an exit surface with a radius of curvature of 19.045 mm.

An incident optical system 4 includes two optical elements 4a and 4b disposed for each light flux.

Each of the two optical elements 4a and 4b is formed of a cylindrical lens made of resin in which an absolute value of a refractive power in the sub scanning direction (in the sub scanning section) is larger than an absolute value of a refractive power in the main scanning direction (in the main scanning section).

Note that the two optical elements 4a and 4b may be formed of an anamorphic lens.

Table 1 illustrates characteristics of the incident system according to this embodiment.

TABLE 1

| Shape | | | |
|---|---|---|---|
| Collimator lenses 3a, 3b | | | |
| Refractive index | N1 | | 1.77 |
| Focal length | f1(mm) | | 24.6 |
| Radius of curvature of incident surface | r1a(mm) | | ∞ |
| Radius of curvature of exit surface | r1b(mm) | | −19.0457 |
| Cylindrical lenses 4a, 4b | | | |
| Refractive index | N2 | | 1.53 |
| Focal length | f2(mm) | | 159 |
| Radius of curvature of incident surface | r2a(mm) | | 84.3621 |
| Radius of curvature of exit surface | r2b(mm) | | ∞ |
| Arrangement | | | |
| Light source 1a to incident surface of 3a | d1(mm) | | 23.35 |
| Incident surface of 3a to exit surface of 3a | d2(mm) | | 3.00 |
| Exit surface of 3a to incident surface of 4a | d3(mm) | | 6.37 |
| Incident surface of 4a to exit surface of 4a | d4(mm) | | 3.00 |
| Exit surface of 4a to deflection surface 5a | d5(mm) | | 108.31 |

Material of the cylindrical lenses 4a and 4b has a refractive index $N_d$ of 1.53. The cylindrical lenses 4a and 4b have a coefficient of linear expansion of $8 \times 10^{-5}$.

The incident surface has no power in the main scanning section and has a power in the sub scanning section. The radius of curvature of the incident surface is +84.3621 mm.

In addition, the exit surface has no power.

In this embodiment, the cylindrical lenses 4a and 4b are molded as one unit lens and are held by a common positional regulation member 13.

However, in the present invention, the cylindrical lens 4a and the cylindrical lens 4b may be made to be separate members so that the cylindrical lens 4a and the cylindrical lens 4b may be held by separate positional regulation members 13a and 13b, respectively.

A stop portion 2 includes two aperture stops 2a and 2b. The two aperture stops 2a and 2b form beam shapes of the light fluxes emitted from the corresponding cylindrical lenses 4a and 4b, respectively.

Note that the collimator lens 3a (3b), the cylindrical lens 4a (4b), and the aperture stop 2a (2b) form an incident optical unit LA.

In addition, the collimator lens 3a (3b) and the cylindrical lens 4a (4b) may be formed of an anamorphic optical element having different powers between in the main scanning direction and in the sub scanning direction.

An optical deflector 5 as the deflection unit is formed of a rotating polygon mirror, for example, and is driven by a drive unit (not shown) such as a motor to rotate at a constant speed in the direction of the arrow A in FIG. 1.

An imaging optical system 6 (fθ lens system) having fθ characteristic is formed of a single imaging lens 6ab.

The imaging optical system 6 makes the light flux of image information deflected for scanning by the optical deflector 5 form an image on a photosensitive drum surface 7 as a surface to be scanned. In addition, the deflection surface 5a of the optical deflector 5 and the photosensitive drum surface 7 have a conjugate relationship with each other in the sub scanning section, to thereby correct the tilt of imaging field.

The photosensitive drum surface 7 corresponds to the surface to be scanned.

In this embodiment, the diverged light fluxes emitted from the light sources 1a and 1b are converted into parallel light fluxes by the corresponding collimator lenses 3a and 3b, respectively.

The converted parallel light fluxes are made to form line images elongated in the main scanning direction on the deflection surface 5a of the polygon mirror 5 by the cylindrical lenses 4a and 4b having power only in the sub scanning section.

In addition, the light fluxes having passed through the cylindrical lenses 4a and 4b have a light flux width restricted by the aperture stops 2a and 2b.

In this embodiment, as illustrated in FIG. 2, the optical axes of the individual collimator lenses 3a and 3b and the optical axes of the cylindrical lenses 4a and 4b are inclined with respect to the deflection surface 5a of the polygon mirror 5 in the sub scanning section.

Thus, the light fluxes emitted from the individual light sources 1a and 1b enter the deflection surface 5a of the polygon mirror 5 in the sub scanning section from a direction oblique with respect to an optical axis oa of the imaging optical system 6 by an angle (±2.5 degrees) (oblique incident optical system).

In addition, also in the main scanning section, the light fluxes emitted from the individual light sources 1a and 1b enter the deflection surface 5a of the polygon mirror 5 from the direction oblique with respect to the optical axis oa of the imaging optical system 6 by the angle.

Then, the individual light fluxes deflected for scanning by the deflection surface 5a of the polygon mirror 5 are made to form spot images on the photosensitive drum surface 7 by the imaging optical system 6.

Further, the polygon mirror 5 is rotated in the direction of the arrow A, and the photosensitive drum surface 7 is scanned with the two light fluxes in the direction of the arrow B for recording the image.

Further, in this embodiment, in order to adjust the timing to start image formation on the photosensitive drum surface 7 before scanning the photosensitive drum surface 7 with the light spot, a synchronization detection sensor 9 is disposed as a photodetector for detecting light emission timing of the light source unit 1.

In addition, a control mechanism (not shown) is disposed for converting a signal from the synchronization detection sensor 9 into an electric signal for controlling.

The synchronization detection sensor 9 receives a light flux for detecting synchronization, which is a part of the light flux deflected for scanning by the optical deflector 5, i.e., a light flux that is scanning an area except an image formation area on the photosensitive drum surface 7 before scanning the image formation area.

The light flux for detecting synchronization is reflected by a mirror 8 and is condensed by a lens for detecting synchronization (not shown) so as to enter the synchronization detection sensor 9.

Then, a synchronizing signal is detected from an output signal of the synchronization detection sensor 9 so that the timing to start the image recording on the photosensitive drum surface 7 is adjusted based on the synchronizing signal.

In other words, the synchronization detection sensor 9 detects a part of the light flux deflected for scanning by the deflection surface of the optical deflector 5, which is used for deciding the write start position timing on the surface to be scanned of the plurality of light fluxes deflected for scanning by the deflection surface of the optical deflector 5.

Next, a way of reducing a change of irradiation position of the light flux on the deflection unit due to an error that may occur in the manufacturing process or the attachment according to this embodiment is described with reference to FIGS. 3 and 4.

Figure 3:
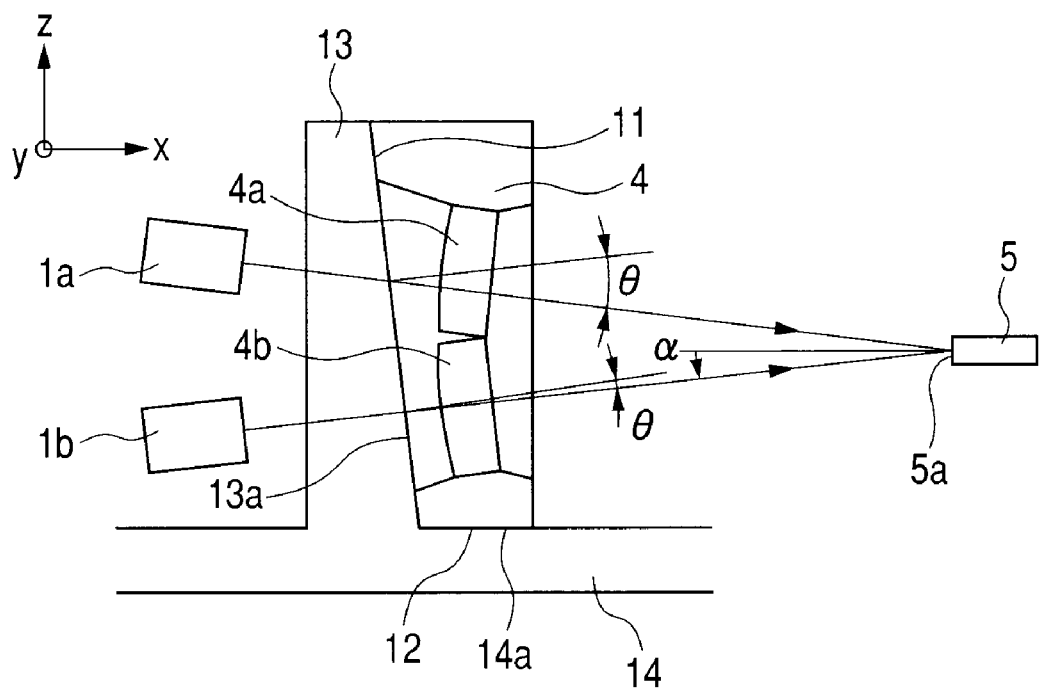
FIG. 3 is an explanatory diagram illustrating an installation example according to the first embodiment of the present invention.

FIG. 3 is a sub scanning sectional view illustrating a structure for positioning the incident optical system 4 in a casing 14.

Figure 4:
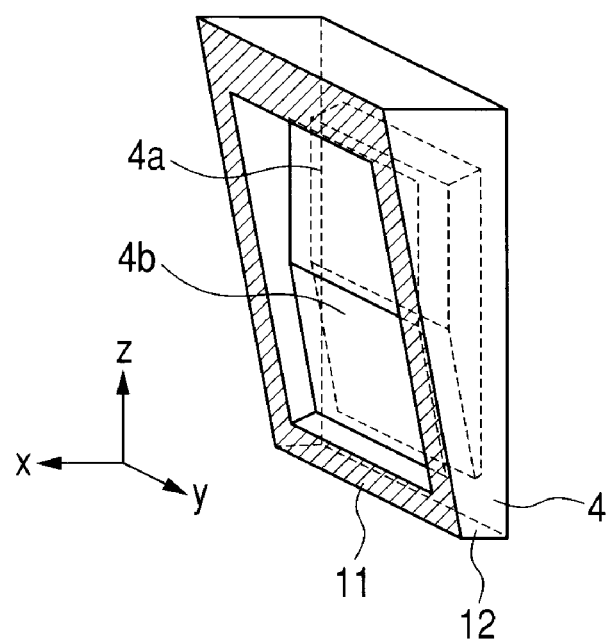
FIG. 4 illustrates a perspective view of a main part of an incident optical system according to the first embodiment of the present invention.

FIG. 4 is a perspective view of a main part of the incident optical system 4.

In FIGS. 3 and 4, the same element as in FIG. 1 or 2 is denoted by the same reference symbol.

As illustrated in FIGS. 3 and 4, the incident optical system 4 is held by the resin casing 14 as described later.

The incident optical system 4 according to this embodiment includes an x reference surface 11 used for positional regulation in the optical axis direction and a z reference surface 12 used for positional regulation in the sub scanning direction.

The casing 14 is provided with the positional regulation member 13 for the x direction that is formed integrally with the inner bottom surface thereof when the casing 14 is molded, and a reference surface (wall) 13a is formed so as to correspond to the x reference surface 11 of the incident optical system 4.

In this embodiment, the x reference surface 11 of the incident optical system 4 contacts with and held by the reference surface 13a of the positional regulation member 13, to thereby perform the positional regulation in the optical axis direction.

In addition, the positional regulation in the sub scanning direction is performed by making the z reference surface 12 of the incident optical system 4 contact with a bottom surface 14a of the casing 14 to be held by the bottom surface 14a.

Further, the incident optical system 4 and the positional regulation member 13 are made to contact with each other with their surfaces so as to be held. Thus, the positional regulation in the optical axis direction is performed, and rotations (tilts) about x, y, and z axes are also regulated.

In this embodiment, when the light flux enters each of the cylindrical lenses 4a and 4, and the two light fluxes go out with different angles in the sub scanning section, the angles are set so as to satisfy the following conditional equation (1).

In FIG. 3, it is supposed that θ represents an angle between the normal of the x reference surface 11 and the principal ray of the outgoing light flux from the incident optical system 4 in the sub scanning section, and that α represents an angle between the principal ray of the light flux having the smallest value of θ and the normal of the deflector 5 in the sub scanning section.

In this case, at least one outgoing light flux among the two outgoing light fluxes is set so as to satisfy the following conditional equation (1).

$$|\theta| < 0.9|\alpha| \tag{1}$$

The conditional equation (1) defines the condition for reducing a change of the irradiation position of the light flux on the deflection unit (deflection surface) due to an error that may occur in the manufacturing process or in the attachment, and defines a range of the tolerance.

If the conditional equation (1) is not satisfied, a shift due to an error that may occur in the manufacturing process or in the attachment increases, and thus sufficient effect of this embodiment cannot be obtained.

On the other hand, if the conditional equation (1) is satisfied, the incident position of the light ray with respect to the cylindrical lens is not changed even if an error exists in the direction parallel to the optical axis.

Note that it is more preferable that the conditional equation (1) should be modified as follows.

$$|\theta| < 0.8|\alpha| \tag{1a}$$

An exemplary mode in this embodiment is the case where the angle α has a value except zero and the angle θ has a value of zero, i.e., the angle θ between the x reference surface 11 and a principal ray of a light flux "b" in the sub scanning section is a right angle.

However, in reality, the angle θ does not become zero completely because of an error in the manufacturing process or the like.

Therefore, in this embodiment, values of the angles α and θ are set so as to satisfy the above-mentioned conditional equation (1). Thus, a change of the irradiation position of the light flux on the deflection unit due to an error that may occur in the manufacturing process or in the attachment is reduced.

In the present invention, the angle α between the principal ray of the light flux having the smallest value of θ and the normal of the optical deflector 5 in the sub scanning section is set to be the angle that satisfies the following equation so that separation of light rays can be performed easily.

$$\tan\alpha > \frac{D}{2L} \tag{2}$$

Here, D represents a diameter of the light flux on the incident surface of the cylindrical lens 4 in the sub scanning section, and L represents an optical path length from the incident surface 4a of the cylindrical lens 4 to the deflection surface 5a.

If the angle α is set so as to satisfy the lower limit value in the conditional equation (2), the plurality of light fluxes do not cross each other, and hence the separation of light rays can be easily performed.

If the lower limit value in the conditional equation (2) is not satisfied, the plurality of light fluxes entering the deflection surface 5a cross each other, and hence the separation of light rays can be hardly performed.

The upper limit value of tan α in the conditional equation (2) should preferably satisfy "$0.10 \geq \tan\alpha$" for decreasing the height of the scanning optical apparatus in the sub scanning direction in the sub scanning section.

In the case of this embodiment, D should be 2.56 mm, L should be 111.31 mm, and the angle α should be 0.66 degrees or larger.

In this embodiment, the angle α between the principal ray of the light flux "b" having the smallest value of θ and the normal of the optical deflector 5 in the sub scanning section is set to be 2.5 degrees.

Therefore, the angle θ between the normal of the x reference surface and the principal ray of the light flux "b" satisfies "θ<2.25 degrees".

If the angle α between the principal ray of the light flux "b" having the smallest value of θ and the normal of the optical deflector 5 in the sub scanning section is 2 degrees or larger, there arises a conspicuous problem of a shift of the irradiation position of the light flux on the deflection unit due to an error that may occur in the manufacturing process or in the attachment.

Next, how the optical axis of the cylindrical lens changes due to an error in this embodiment is compared with the case of the conventional example.

Figure 6A:
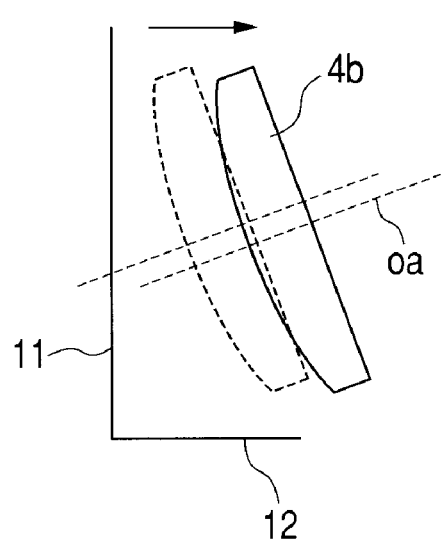
FIGS. 6A and 6B are explanatory diagrams illustrating a change of an optical axis due to an error in a conventional structure and in the first embodiment, respectively.
Figure 6B:
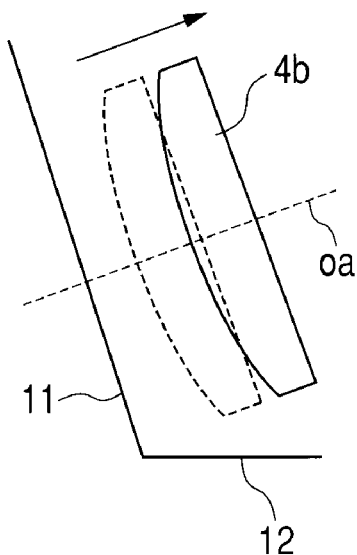

FIGS. 6A and 6B are schematic diagrams illustrating how the optical axis changes due to an error in the conventional example and in this embodiment, respectively.

FIGS. 6A and 6B are schematic diagrams illustrating a positional relationship between the cylindrical lens 4b and the x reference surface 11 as well as the z reference surface 12, which illustrate a moving state of the optical axis L when an error occurs in the direction perpendicular to the x reference surface 11.

In the conventional installation method illustrated in FIG. 6A (in which the x reference surface 11 is perpendicular to the z reference surface 12), the position of the cylindrical lens 4b changes in the normal direction of the x reference surface 11 within the range of the error when the incident optical system 4 exists inclining with respect to the x reference surface 11.

In this case, the optical axis oa of the cylindrical lens 4b moves in the sub scanning section, and the irradiation position of the light flux outgoing from the cylindrical lens 4b changes on the deflection unit.

However, in the installation method illustrated in FIG. 6B according to this embodiment (in which the x reference surface 11 is not perpendicular to the z reference surface 12), the optical axis oa of the cylindrical lens 4b moves in the normal direction of the x reference surface 11.

Therefore, in the sub scanning section, the irradiation position of the light flux outgoing from the cylindrical lens 4b does not change on the deflection unit.

In the case of this embodiment illustrated in FIG. 3, with consideration of a draft angle necessary for molding, the principal ray of the outgoing light flux (light flux emitted from the light source 1b) that is closer to the bottom surface of the casing 14 becomes perpendicular to the x reference surface 11.

In this embodiment, the principal ray enters the optical axis of the cylindrical lens 4b. Therefore, even if an error exists in the direction parallel to the optical axis, the incident position of the light ray does not change with respect to the cylindrical lens 4b, and hence the irradiation position of the outgoing light ray does not change. In other words, the principal rays of the light fluxes "a" and "b" emitted from the light sources 1a and 1b respectively are set to be parallel with the optical axes of the cylindrical lenses 4a and 4b as optical elements in the sub scanning section.

The coefficient of linear expansion of the positional regulation member 13 is $2\times10^{-5}$. The coefficient of linear expansion of the positional regulation member 13 is smaller than the coefficient of linear expansion of the cylindrical lenses 4a and 4b, and hence expansion or contraction of the lens of when the temperature changes is small.

In this embodiment, the material of the collimator lenses 3a and 3b has a refractive index $N_d$ of 1.7725 as described above, and the collimator lenses 3a and 3b are spherical lenses having the incident surface without power (refractive power) and the exit surface with a radius of curvature of 19.045 mm.

In addition, the material of the cylindrical lenses 4a and 4b has a refractive index $N_d$ of 1.5306.

The incident surfaces of the cylindrical lenses 4a and 4b have no power in the main scanning section and have power in the sub scanning section with the surface having a radius of curvature of −84.362 mm.

The exit surfaces of the cylindrical lenses 4a and 4b have no power.

Next, effects are compared between the conventional example and the present invention.

In this embodiment, the present invention is effective only in the case where an error occurs in the direction perpendicular to the x reference surface, and is equivalent to the conventional example if an error occurs in the direction perpendicular to the z reference surface. Therefore, it is supposed for the comparison that there is no error component in the direction perpendicular to the z reference surface.

In the conventional example, if an error of the cylindrical lens 4b occurs by 50 μm as a tolerance in the direction perpendicular to the x reference surface 11 as illustrated in FIG. 6A, the irradiation position moves by approximately 2 μm on the deflection surface 5a in the sub scanning direction.

In contrast, in this embodiment, even if an error occurs in the direction perpendicular to the x reference surface 11, no shift of the irradiation position occurs.

As a result, in this embodiment, the light flux that satisfies the conditional equation (1) has a decreased change of the irradiation position of the light flux on the deflection unit due to a manufacturing error or an attachment error. Therefore, when the light flux is used as a reference light flux for correction, the correction can be performed easily.

Thus, in this embodiment, using the incident optical system 4 in which the cylindrical lenses 4a and 4b are disposed as described above, the irradiation spot (object point) can be formed at a predetermined position on the deflection surface, i.e., at a predetermined position on the surface to be scanned.

Further, in combination with the imaging optical system that performs correction of the tilt of imaging field, the conjugate relationship between the object point on the deflection surface and the image point on the image surface is maintained, and as a result, the light flux can form the image at a predetermined position on the surface to be scanned 7.

In addition, in this embodiment, the light flux that satisfies the conditional equation (1) is made to enter the synchronization detection sensor 9, and hence, it is possible to realize the structure in which a synchronization detection error due to deviation of the light flux from the synchronization detection sensor 9 hardly occurs.

In addition, in this embodiment, the light flux that satisfies the conditional equation (1) is used as a reference light flux for correcting a bend of the scanning line formed by the plurality of light fluxes which scans the surface to be scanned, and thus correction of a bend or a misregistration of the scanning line can be performed easily.

Therefore, even if θ of the light flux "a" emitted from the light source 1a in this embodiment is deteriorated compared with the conventional example, an error or a misregistration of the scanning line can be corrected by using other methods such as electric correction when the light flux "b" emitted from the light source 1b is used as a reference light flux.

In addition, in this embodiment, a manufacturing error or an attachment error of a component that may occur in the manufacturing process can be reduced so that manufacturing efficiency can be increased.

Thus, in this embodiment, the angle between the principal ray of at least one light flux outgoing from the incident optical system 4 and the x reference surface 11 is set so as to satisfy the conditional equation (1).

Thus, by the simple method of setting the x reference surface, the scanning optical apparatus with high image quality can be obtained easily.

Further, in this embodiment, by setting the x reference surface so as to satisfy the conditional equation (1), it is possible to reduce the number of errors to be controlled, which is usually three in the conventional incident optical system, i.e., three errors in the optical axis direction, in the main scanning direction, and in the sub scanning direction.

Thus, an error component in the normal direction of the x reference surface does not need to be considered, which is the obtained effect.

Note that this embodiment describes the case where the above-mentioned structure is applied to the cylindrical lens 4, but the structure may be applied to the collimator lens without limited to this embodiment.

In addition, the same effect can also be obtained by applying the structure to a resin anamorphic lens having both functions of a collimator lens and a cylindrical lens in which power in the main scanning direction is different from power in the sub scanning direction.

In addition, this embodiment has the structure in which the conditional equation (1) is satisfied with respect to the light flux "b" emitted from the light emission portion of the light source 1b, but this structure should not be interpreted as a limitation. It is possible to adopt another structure in which the conditional equation (1) is satisfied also with respect to the light flux "a" emitted from the light emission portion of the light source 1a.

If the conditional equation (1) is satisfied with respect to the light flux emitted from the light emission portion of the light source 1b and the light flux emitted from the light emission portion of the light source 1a, imaging misregistration in the main scanning direction and imaging misregistration in the sub scanning direction on the photosensitive drum 7 due to an attachment error of the incident optical system 4 can be reduced as an effect of the structure.

(Second Embodiment)

Figure 5:
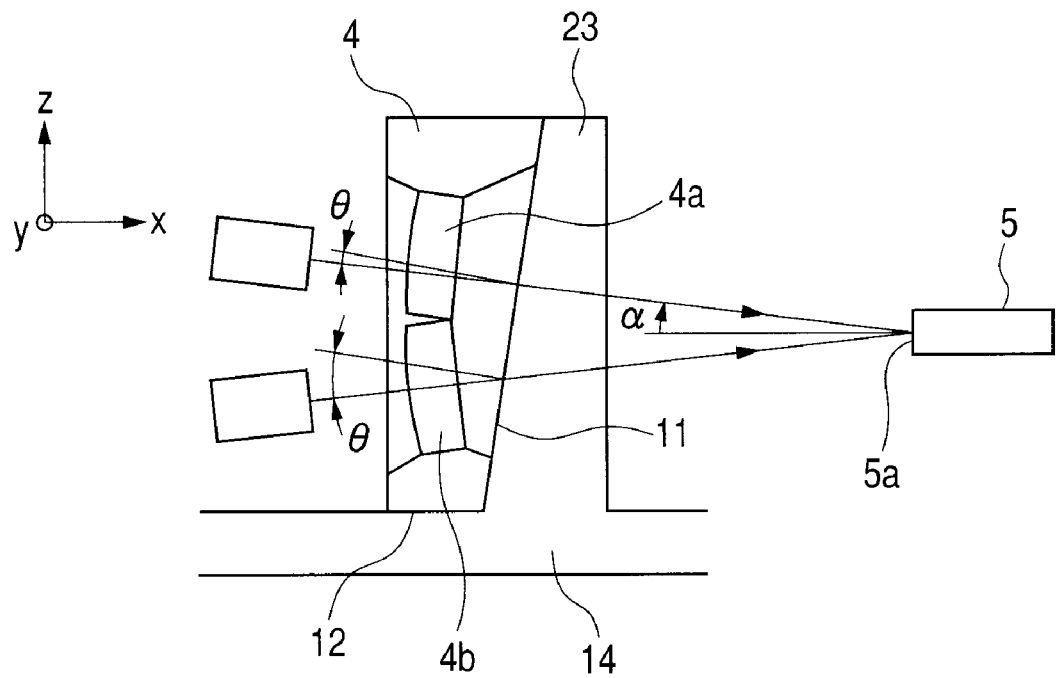
FIG. 5 is an explanatory diagram illustrating an installation example according to a second embodiment of the present invention.

FIG. 5 is a schematic diagram of a main part of a sub scanning section illustrating a structure for positioning an incident optical system in a casing according to a second embodiment of the present invention.

In FIG. 5, the same element as illustrated in FIG. 3 is denoted by the same reference symbol.

This embodiment is different from the first embodiment described above in that a positional relationship between the incident optical system 4 and a positional regulation member 23 is changed in the structure.

Other structure and the optical action are the same as those in the above-mentioned first embodiment, and hence the same effect can be obtained.

In other words, in this embodiment, the positional regulation member 23 of a casing 14 is disposed at the rear (deflection unit 5 side) of the incident optical system 4.

Thus, this embodiment is effective in the case where the incident optical system 4 is to be disposed in the light source unit 1 side.

In this case, in the sub scanning section, the positional regulation member 23 of the casing 14 has an inclination on the opposite side to the case of the first embodiment so that the outgoing light flux (light flux "a" emitted from the light source 1a) that is farthest from the z reference surface 12 among the plurality of light fluxes outgoing from the incident optical system 4 is substantially perpendicular to the x reference surface.

In other words, the angles $\alpha$ and $\theta$ are set so that the conditional equation (1) is satisfied.

Thus, a change of the irradiation position of the light flux on the deflection unit due to an error that may occur in the manufacturing process or in the attachment is reduced.

In this embodiment, the angle $\alpha$ between the principal ray of the light flux "a" having the smallest value of $\theta$ and the normal of the optical deflector 5 in the sub scanning section is set to be 2.5 degrees. Therefore, the angle $\theta$ between the normal of the x reference surface and the principal ray of the light flux "a" in the sub scanning section satisfies "$\theta<2.25$ degrees".

In addition, this embodiment has the structure in which the conditional equation (1) is satisfied with respect to the light flux "a" emitted from the light emission portion of the light source 1a, but this structure should not interpreted as a limitation. It is possible to adopt another structure in which the conditional equation (1) is satisfied also with respect to the light flux "b" emitted from the light emission portion of the light source 1b.

(Third Embodiment)

Figure 7:
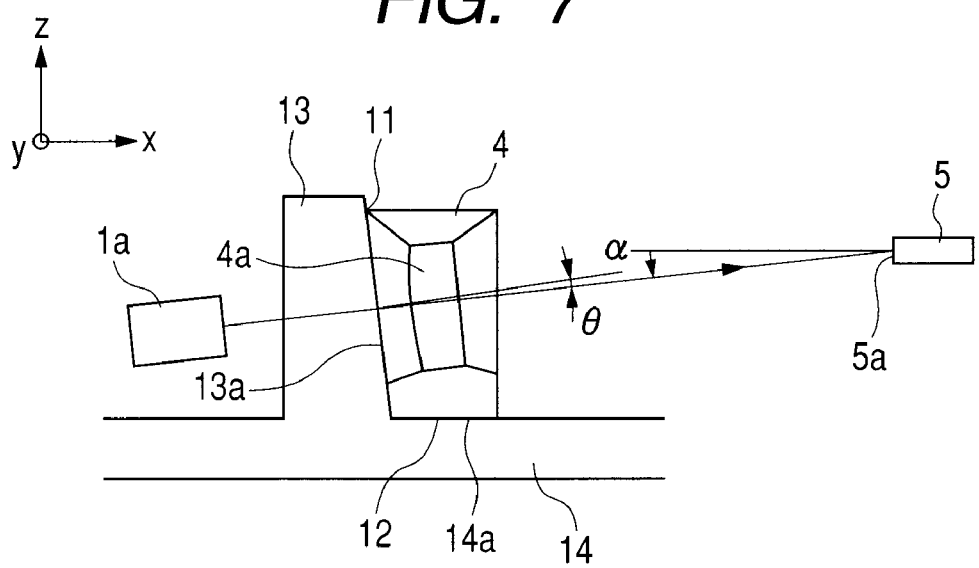
FIG. 7 is an explanatory diagram illustrating an installation example according to a third embodiment of the present invention.

FIG. 7 is a schematic diagram of a main part of a sub scanning section illustrating a structure for positioning an incident optical system in a casing according to a third embodiment of the present invention.

In FIG. 7, the same element as illustrated in FIG. 3 is denoted by the same reference symbol.

This embodiment is different from the first embodiment described above in that the light source unit is formed by a single light source.

Other structure and the optical action are the same as those in the above-mentioned first embodiment, and hence a change of the irradiation position of the light flux on the deflection unit due to an error that may occur in the manufacturing process or in the attachment is reduced.

In this embodiment, the angle $\alpha$ between the principal ray of the light flux "a" emitted from the light source 1a and the normal of the optical deflector 5 in the sub scanning section is set to be 2.5 degrees.

Therefore, the angle $\theta$ between the normal of the x reference surface and the principal ray of the light flux "a" in the sub scanning section satisfies "$\theta<2.25$ degrees".

(Fourth Embodiment)

Figure 8:
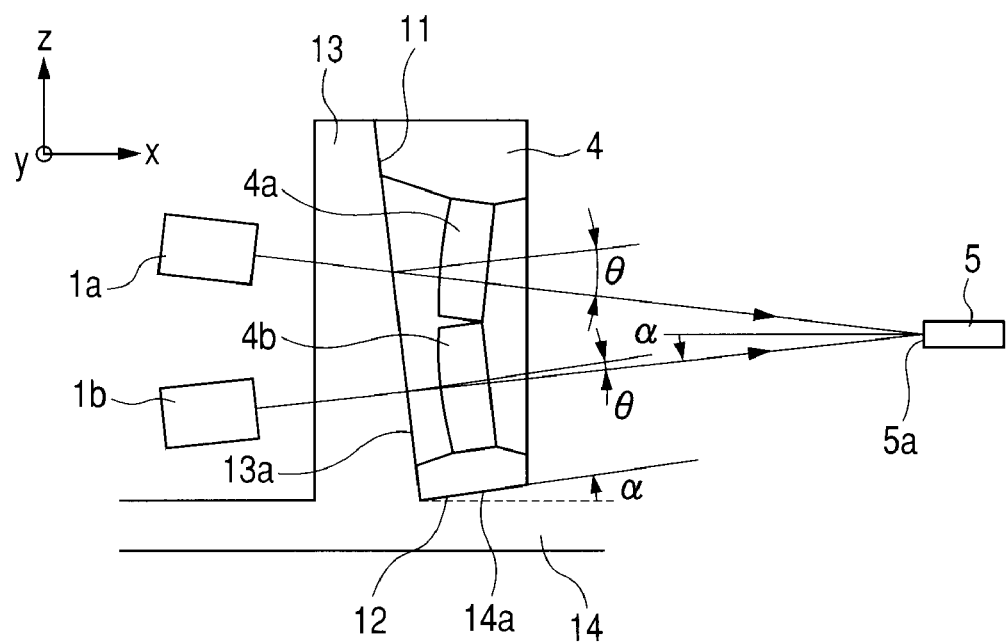
FIG. 8 is an explanatory diagram illustrating an installation example according to a fourth embodiment of the present invention.

FIG. 8 is a schematic diagram of a main part of a sub scanning section illustrating a structure for positioning an incident optical system in a casing according to a fourth embodiment of the present invention.

In FIG. 8, the same element as illustrated in FIG. 3 is denoted by the same reference symbol.

This embodiment is different from the first embodiment described above in that an inclination angle $\alpha$ is provided to the z reference surface so that the x reference surface becomes perpendicular to the z reference surface in the sub scanning section.

Other structure and the optical action are the same as those in the above-mentioned first embodiment, and hence a change of the irradiation position of the light flux on the deflection unit due to an error that may occur in the manufacturing process or in the attachment is reduced.

Specifically, the inclination angle $\alpha$ of the z reference surface in the sub scanning section is set to be equal to the angle $\alpha$ between the principal ray of the light flux "a" having the smallest value of $\theta$ and the normal of the optical deflector 5 in the sub scanning section.

With this structure, a displacement occurs only in the direction perpendicular to the x reference surface. Therefore, even if an error occurs in the direction perpendicular to the x reference surface 11, a shift of the irradiation position of the light flux "b" on the deflection unit does not occur.

In other words, in this embodiment, if an error occurs in the direction perpendicular to the x reference surface, a deviation amount of the irradiation position of the light flux "b" on the deflection unit can be reduced compared with the first embodiment.

In this embodiment, the angle $\alpha$ between the principal ray of the light flux "b" and the normal of the optical deflector 5 in the sub scanning section is set to be 2.5 degrees.

Therefore, the angle $\theta$ between the normal of the x reference surface and the principal ray of the light flux "b" satisfies "$\theta<2.25$ degrees".

Color Image Forming Apparatus

Figure 9:
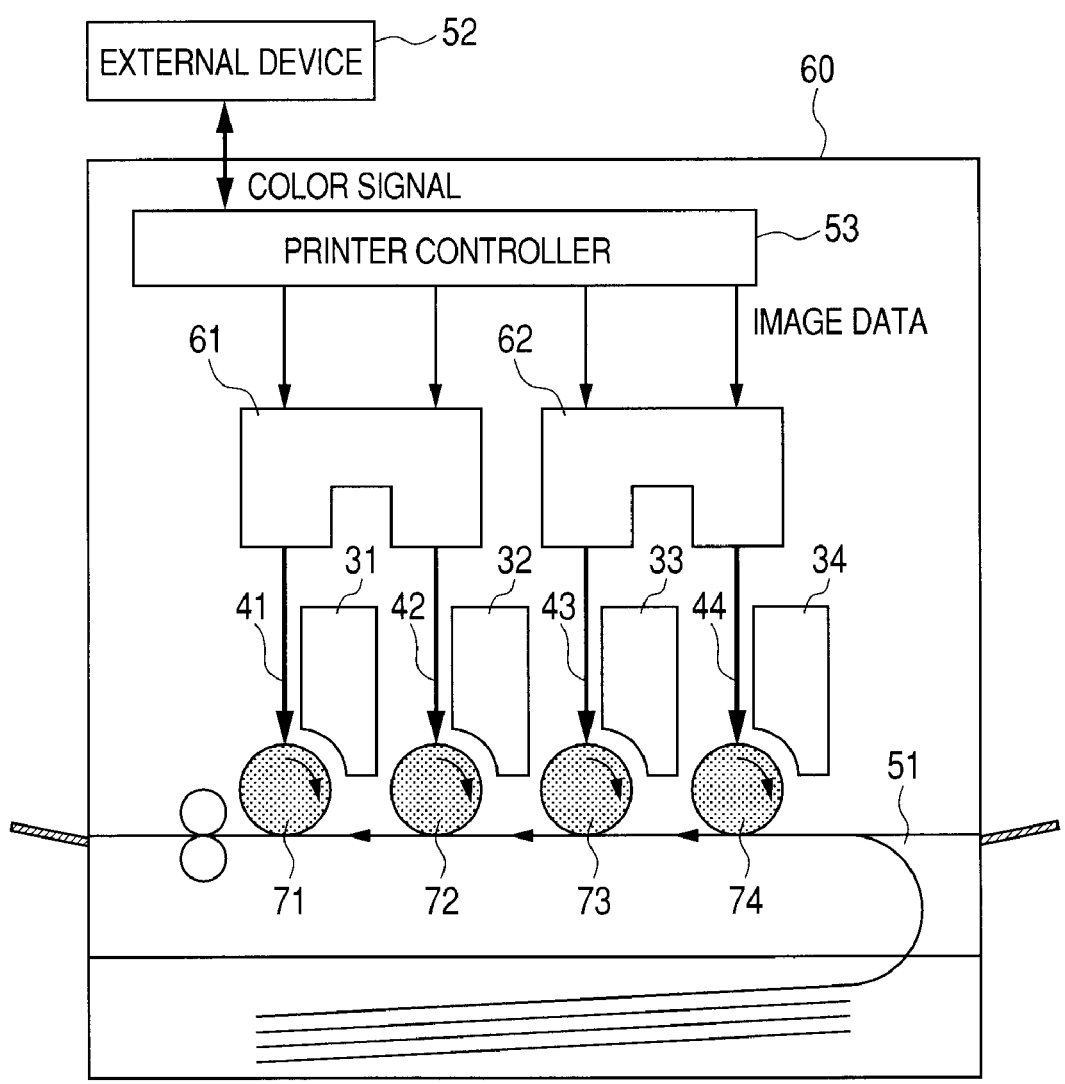
FIG. 9 is a schematic diagram of a main part of a color image forming apparatus according to an embodiment of the present invention.

FIG. 9 is a schematic diagram of a main part of a color image forming apparatus according to an embodiment of the present invention.

The color image forming apparatus of this embodiment is of tandem type, which includes four optical scanning apparatuses (optical scanning systems) arranged side by side to record concurrently image information on surfaces of photosensitive drums, which serve as image bearing members.

In FIG. 9, a color image forming apparatus 60 includes scanning optical apparatuses 61 and 62 having any one of the structures described above in the first, second, and fourth embodiments, photosensitive drums 71, 72, 73, and 74 as image bearing members, developing devices 31, 32, 33, and 34, and a conveyor belt 51. Note that the illustrated one aspect of the image forming apparatus is the case of using the scanning optical apparatuses each including the two incident optical systems that are integrated. However, it is possible to use four scanning optical apparatuses each of which is formed of a single incident optical system as described in the third embodiment so as to form the image forming apparatus.

It should be noted that, in FIG. 9, there are provided a transferring device (not shown) for transferring a toner image developed by the developing device onto a transfer material, and a fixing device (not shown) for fixing the transferred toner image on the transfer material.

In FIG. 9, respective color signals of red (R), green (G), and blue (B) are input from an external device 52 such as a personal computer to the color image forming apparatus 60. The color signals are converted into pieces of image data (dot data) of cyan (C), magenta (M), yellow (Y), and black (B) by a printer controller 53 in the color image forming apparatus.

The respective pieces of image data are input to the optical scanning apparatuses 61 and 62.

Light beams 41, 42, 43, and 44, which are modulated according to the respective pieces of image data, are emitted from the optical scanning apparatuses. Photosensitive surfaces of the photosensitive drums 71, 72, 73, and 74 are scanned with the light beams in a main scanning direction.

In the color image forming apparatus of this embodiment, the two optical scanning apparatuses (61 and 62) are arranged side by side, and correspond to a pair of colors of cyan (C) and magenta (M) and a pair of colors of yellow (Y) and black (B), respectively.

The optical scanning apparatuses concurrently record the image signals (image information) on the surfaces of the photosensitive drums 71, 72, 73, and 74, and print a color image at high speed.

As described above, the color image forming apparatus of this embodiment uses the light beams which are respectively based on image data and emitted from the two optical scanning apparatuses 61 and 62 to form latent images of respective colors on the surfaces of the photosensitive drums 71, 72, 73, and 74 respectively associated with respective colors. The latent images are then transferred to a recording material one on another through multilayer transfer to form one full color image.

The external device 52 may be a color image reading device including a CCD sensor. In this case, the color image reading device and the color image forming apparatus 60 form a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287638, filed on Nov. 10, 2008 which is hereby incorporated by reference herein in its entirety.

What is claimed is:

1. A scanning optical apparatus, comprising:
a light source unit including a plurality of light emission portions;
a deflection unit for deflecting a plurality of light fluxes for scanning that are emitted from the plurality of light emission portions;
an incident optical system which is disposed in an optical path between the light source unit and the deflection unit, and includes a plurality of optical elements disposed for each of the plurality of light fluxes so as to make each of the plurality of light fluxes emitted from the plurality of light emission portions enter a deflection surface of the deflection unit with an oblique angle in a sub scanning section;
a plurality of imaging optical systems disposed so as to correspond to the plurality of light fluxes deflected for scanning by the same deflection surface of the deflection unit; and
a positional regulation member for holding the plurality of optical elements each having an x reference surface for performing positional regulation of the optical element in an optical axis direction and a z reference surface for performing positional regulation of the optical element in a sub scanning direction, wherein:
each of the plurality of imaging optical systems makes each of the plurality of light fluxes deflected for scanning by the deflection surface of the deflection unit form an image on a surface to be scanned;
the plurality of optical elements are formed integrally;
the plurality of light fluxes outgo from the plurality of optical elements with different angles in the sub scanning section;
each of principal rays of the plurality of light fluxes emitted from the plurality of light emission portions is parallel to an optical axis of each of the plurality of optical elements in the sub scanning section;
each of the plurality of optical elements is held by a casing so that the x reference surface and the z reference surface of each of the plurality of optical elements contact with the positional regulation member; and
when an angle between a normal of the x reference surface and each of the principal rays of the plurality of light fluxes outgoing from the plurality of optical elements in the sub scanning section is denoted by θ, an angle between the principal ray having a smallest value of θ among the plurality of light fluxes outgoing from the plurality of optical elements and a normal of the deflection surface in the sub scanning section is denoted by α, a light flux diameter of the light flux entering an incident surface of the optical element in the sub scanning section is denoted by D, and an optical path length from the incident surface of the optical element to the deflection surface is denoted by L,
with regard to the principal ray of at least one light flux of the plurality of light fluxes outgoing from the plurality of optical elements, the following conditional equation is satisfied $$|\theta| < 0.9|\alpha| \qquad (1),$$

and with regard to the angle α between the light flux outgoing from the optical element and the normal of the deflection surface in the sub scanning section, the following conditional equation is satisfied $$\tan\alpha > \frac{D}{2L}. \qquad (2)$$

2. A scanning optical apparatus according to claim 1, further comprising a synchronization detection sensor for detecting a part of the light flux deflected for scanning by the deflection surface of the deflection unit, the synchronization detection sensor deciding a write start position timing on the surface to be scanned of the plurality of light fluxes deflected for scanning by the deflection surface of the deflection unit,
wherein the light flux for synchronization detection detected by the synchronization detection sensor satisfies the conditional equation (1).

3. A scanning optical apparatus according to claim 1, wherein each of the principal rays of the plurality of light fluxes outgoing from the plurality of optical elements satisfies the following conditional equation $$|\theta|<0.9|\alpha| \qquad (3).$$

4. A scanning optical apparatus according to claim 1, wherein each of the plurality of optical elements forming the incident optical system has an absolute value of power in the sub scanning direction that is larger than an absolute value of power in a main scanning direction.

5. A scanning optical apparatus according to claim 1, wherein the angle θ between the normal of the x reference surface and the principal ray of the light flux that satisfies the conditional equation (1) in the sub scanning direction is zero.

6. A scanning optical apparatus according to claim 1, wherein the positional regulation member for holding the plurality of optical elements is made of resin and is molded integrally with the casing.

7. An image forming apparatus, comprising:
the scanning optical apparatus according to claim 1;
a photosensitive member disposed on the surface to be scanned;
a developing device for developing an electrostatic latent image formed on the photosensitive member by the light flux deflected for scanning by the scanning optical apparatus to be a toner image;
a transferring device for transferring the toner image after the developing onto a transfer material; and
a fixing device for fixing the transferred toner image on the transfer material.

8. A scanning optical apparatus, comprising:
a light source unit;
a deflection unit for deflecting a light flux for scanning that is emitted from a light emission portion of the light source unit;
an incident optical system which is disposed in an optical path between the light source unit and the deflection unit, and includes an optical element for making the light flux emitted from the light emission portion enter a deflection surface of the deflection unit with an oblique angle in a sub scanning section;
an imaging optical system for making the light flux deflected for scanning by the deflection surface of the deflection unit form an image on a surface to be scanned; and
a positional regulation member for holding the optical element having an x reference surface for performing positional regulation of the optical element in an optical axis direction and a z reference surface for performing positional regulation of the optical element in a sub scanning direction, wherein:
a principal ray of the light flux emitted from the light emission portion is parallel to an optical axis of the optical element in the sub scanning section;
the optical element is held by a casing so that the x reference surface and the z reference surface of the optical element contact with the positional regulation member; and
when an angle between a normal of the x reference surface and the principal ray of the light flux outgoing from the optical element in the sub scanning section is denoted by θ, an angle between the light flux outgoing from the optical element and a normal of the deflection surface in the sub scanning section is denoted by α, a light flux diameter of the light flux entering an incident surface of the optical element in the sub scanning section is denoted by D, and an optical path length from the incident surface to the deflection surface of the optical element is denoted by L,
with regard to the principal ray of the light flux outgoing from the optical element, the following conditional equation is satisfied $$|\theta|<0.9|\alpha| \qquad (4),$$

and with regard to the angle α between the light flux outgoing from the optical element and the normal of the deflection surface in the sub scanning section, the following conditional equation is satisfied $$\tan\alpha > \frac{D}{2L}. \qquad (5)$$

9. A scanning optical apparatus according to claim 8, further comprising a synchronization detection sensor for detecting a part of the light flux deflected for scanning by the deflection surface of the deflection unit, the synchronization detection sensor deciding a write start position timing on the surface to be scanned of the light flux deflected for scanning by the deflection surface of the deflection unit,
wherein the light flux for synchronization detection detected by the synchronization detection sensor satisfies the conditional equation (4).

10. A scanning optical apparatus according to claim 8, wherein the angle θ between the normal of the x reference surface and the principal ray of the light flux that satisfies the conditional equation (4) in the sub scanning direction is zero.

11. An image forming apparatus, comprising:
the scanning optical apparatus according to claim 8;
a photosensitive member disposed on the surface to be scanned;
a developing device for developing an electrostatic latent image formed on the photosensitive member by the light flux deflected for scanning by the scanning optical apparatus to be a toner image;
a transferring device for transferring the toner image after the developing onto a transfer material; and
a fixing device for fixing the transferred toner image on the transfer material.

* * * * *